US007408608B2

(12) United States Patent
Lee

(10) Patent No.: US 7,408,608 B2
(45) Date of Patent: Aug. 5, 2008

(54) IN-PLANE SWITCHING MODE LCD DEVICE HAVING PARTICULAR PIXEL ELECTRODES AND PARTICULAR COMMON ELECTRODES

(75) Inventor: Won Ho Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 441 days.

(21) Appl. No.: 11/296,534

(22) Filed: Dec. 8, 2005

(65) Prior Publication Data

US 2006/0125991 A1     Jun. 15, 2006

(30) Foreign Application Priority Data

Dec. 14, 2004   (KR) ...................... 10-2004-0105585

(51) Int. Cl.
   *G02F 1/1343*   (2006.01)
(52) U.S. Cl. ........................ 349/141; 349/146; 349/144
(58) Field of Classification Search .................. 349/141, 349/144, 146
   See application file for complete search history.

(56) References Cited

U.S. PATENT DOCUMENTS 6,266,116 B1 *   7/2001   Ohta et al. .................. 349/141
6,512,565 B1 *   1/2003   Lee et al. ..................... 349/130
6,642,984 B1 *   11/2003  Yoshida et al. .............. 349/139
2006/0146241 A1* 7/2006   Choi et al. .................. 349/129
2006/0146253 A1* 7/2006   Kang .......................... 349/141

FOREIGN PATENT DOCUMENTS

| KR | 2002-85244 | 11/2002 |
| KR | 2002-89979 | 11/2002 |
| KR | 2004-21999 | 3/2004 |

* cited by examiner

*Primary Examiner*—Mike Qi
(74) *Attorney, Agent, or Firm*—Morgan, Lewis & Bockius LLP

(57) ABSTRACT

An IPS mode LCD device includes gate and data lines formed on a first substrate, the gate lines cross the data lines vertically to define pixel regions; thin film transistors formed at each intersection of the gate lines and the data lines; common lines formed in parallel with the gate lines; common electrodes formed extending from the common lines, the common electrodes formed in parallel with the data lines; pixel electrodes having a slant portion and a vertical portion formed in a single body, the slant portion arranged to cross each pixel region in a slant direction, and the vertical portion of the pixel electrode overlaps with the common electrodes; and a second substrate bonded to the first substrate and interposing a liquid crystal layer therebetween.

17 Claims, 9 Drawing Sheets

IN-PLANE SWITCHING MODE LCD DEVICE HAVING PARTICULAR PIXEL ELECTRODES AND PARTICULAR COMMON ELECTRODES

This application claims the benefit of the Korean Patent Application No. P2004-105585, filed on Dec. 14, 2004, which is hereby incorporated by reference.

BACKGROUND OF THE INVENTION

1. Field of the Invention

The present invention relates to a liquid crystal display (LCD) device, and more particularly, to an in-plane switching (IPS) mode LCD device where an opening region formed in the pixel region is increased and a disclination region is minimized to maximize transmittance of light to the LCD panel.

2. Background of the Related Art

Flat panel displays are available in a variety of types. Among them, the LCD device has become a popular display device because of the advantageous characteristics that the LCD device offers, such as having a high contrast ratio, being thin, being lightweight, having features suitable for displaying gray level or moving pictures, and having low power consumption. Specifically, some of the LCD devices have been identified as the next generation display devices, for example, ultra thin displays for wall TVs and displays for notebook computers. In addition, the LCD device is used for a mobile display since a smaller size panel can be easily manufactured.

Furthermore, the LCD device has various modes depending on characteristics of liquid crystal and electrode structures. Some examples of the LCD devices include a twisted nematic (TN) mode LCD device, a multi-domain mode LCD device, an optically compensated birefringence (OCB) mode LCD device, an IPS mode LCD device, and a vertical alignment (VA) mode LCD device. In the TN mode LCD device, liquid crystal directors are arranged in a twisted angle of 90° and voltages are applied to control the liquid crystal directors. In the multi-domain mode LCD device, one pixel is divided into a plurality of domains and main viewing angles of the respective domains vary from one another to obtain a wide viewing angle. In the OCB mode LCD device, a compensation film is attached to an outer surface of a substrate to compensate phase variation of light depending on a progress direction of the light. In the IPS mode LCD device, two electrodes are formed on one substrate and liquid crystal directors are twisted in parallel with an alignment film. In the VA mode LCD device, liquid crystal molecules are vertically arranged on an alignment film using a negative liquid crystal and a vertical alignment film.

The IPS mode LCD device includes a color filter array substrate and a thin film transistor array substrate. The color filter array substrate is provided with a black matrix layer that prevents light leakage and R/G/B color filter layers for representing colors. The thin film transistor array substrate is provided with gate and data lines for defining unit pixels, the thin film transistors (i.e., switching elements) are formed at each intersection of the respective gate and data lines, and common and pixel electrodes are alternately arranged to generate transverse electric fields.

A related art IPS mode LCD device will be described with reference to the accompanying drawings. FIG. 1 is a plane view illustrating a related art IPS mode LCD device, FIG. 2 is a diagram illustrating transmittance of light in FIG. 1, FIG. 3 is a plane view illustrating another related art IPS mode LCD device, and FIG. 4 is a diagram illustrating transmittance of light in FIG. 3.

As shown in FIG. 1, a thin film transistor array substrate includes gate lines 12, data lines 15, thin film transistors, common lines 25, a plurality of common electrodes 24, and a plurality of pixel electrodes 17. The gate lines 12 vertically cross the data lines 15 to define pixel regions. The gate insulating films are interposed between the gate lines 12 and the data lines 15. Each of the thin film transistors is formed at each intersection of the respective gate and data lines 12 and 15. The thin film transistor includes a gate electrode 12a, a gate insulating film, a semiconductor layer 14 and source and drain electrodes 15a and 15b. The common lines 25 are formed in parallel with the gate lines 12. The common electrodes 24 are formed extending from the common lines 25 and formed in parallel with the data lines 15. Each pixel electrode 17 is connected to a drain electrode 15b and formed in parallel with each common electrode 24. The pixel electrodes 17 are arranged alternating with the common electrodes 24 in the horizontal direction.

In the IPS mode LCD device, the common electrode 24 and the pixel electrode 17 are formed on the same substrate to rotate liquid crystal molecules horizontally. Voltages are applied between the common and pixel electrodes to generate the transverse electric field E, so that the arrangement of the liquid crystal molecules is controlled. If the distance between the common electrode 24 and the pixel electrode 17 is long, the electric field becomes weak, whereas, if the distance between the common electrode 24 and the pixel electrode 17 is too short, the number of electrodes increases and an opening ratio deteriorates. Therefore, the distance between the two electrodes is important and care should be given while choosing a proper range. As shown FIG. 1, the area enclosed by the common electrode 24 within the pixel region is divided into two blocks 30, in which the each block 30 has a width D obtained by an optimized design rule. However, since the size of the pixel region depends on models of the LCD device, it is difficult to optimally arrange the blocks. For example, when the common electrodes are formed at both edges inside the pixel region and the pixel electrodes 17 are inserted between the common electrodes, then even numbers of blocks are needed in a horizontal direction. For this reason, it is difficult to optimally arrange the blocks.

Moreover, if the number of pixel regions in a high resolution model is relatively more than that of the pixel regions in the other model having the same sized panel, the size of the pixel region is small. Therefore, only two blocks may be formed in the pixel region.

When the pixel region has a width and a length of 28 μm×84 μm, the data line 15, the pixel electrode 17, two common electrodes 24 having a width of 4 μm are arranged in the pixel region. In this case, an opening region within the pixel region has a width of approximately 10 μm. Accordingly, an opening ratio is greatly reduced.

If voltages are applied to the related art IPS mode LCD device, the transmittance of light occurs as shown in FIG. 2. The transverse electric field is not formed at a portion where the common electrode 24 is extended from the common line 25, to promote the arrangement of the liquid crystal molecules in a desired direction. As a result, a disclination "region A" where no light transmits is generated.

Meanwhile, as shown in FIG. 3, the width of the pixel region increases and its length decreases to obtain a pixel region having a width and a length of 42 μm×42 μm. To obtain a super-IPS mode, a pixel electrode 117 and a common electrode 124 may be formed in a bent shape. In FIG. 3, a reference number 112 denotes gate lines, a reference number 115 denotes data lines, and a reference number 125 denotes common lines The super-IPS mode means that a domain is divided into two sub-domains to arrange the liquid crystal molecules. Such two domains can minimize an inverted domain region. However, as shown in FIG. 4, a domain boundary occurs at portions where the pixel electrode 117 and the common electrode 124 are bent, so that the alignment direction of the liquid crystal molecules is divided. In this case, module efficiency is reduced, and the vertical electric field and the horizontal electric field (transverse electric field) are affected by each other to cause a wide disclination region (dark portion).

In other words, the disclination region where the liquid crystal molecules are not arranged in a desired direction corresponds to a region where the horizontal electric field is generated between each common electrode 124 and each pixel electrode 117. The generated horizontal electric field interferes with the vertical electric field generated either between adjacent common electrodes 124 or between the pixel electrodes 117 at corners of the pixel region. Since the light is not transmitted to the disclination region, mode efficiency is reduced.

SUMMARY OF THE INVENTION

Accordingly, the present invention is directed to an IPS mode LCD device that substantially obviates one or more problems due to limitations and disadvantages of the related art.

An object of the present invention is to provide an IPS mode LCD device where a pixel electrode is formed having the slant portion which crosses an opening region, in which the opening region is formed having the maximum range in the instant pixel region.

Another object of the present invention is to provide a IPS mode LCD device having minimized disclination region, thereby improving mode efficiency.

Additional features and advantages of the invention will be set forth in the description which follows, and in part will become apparent from the description, or may be learnt by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an IPS mode LCD device includes gate and data lines formed on a first substrate, the gate lines cross the data lines vertically to define pixel regions; thin film transistors formed at each intersection of the gate lines and the data lines; common lines formed in parallel with the gate lines; common electrodes formed extending from the common lines, the common electrodes formed in parallel with the data lines; pixel electrodes having a slant portion and a vertical portion formed in a single body, the slant portion arranged to cross each pixel region in a slant direction, and the vertical portion of the pixel electrode overlaps with the common electrodes; and a second substrate bonded to the first substrate and interposing a liquid crystal layer therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
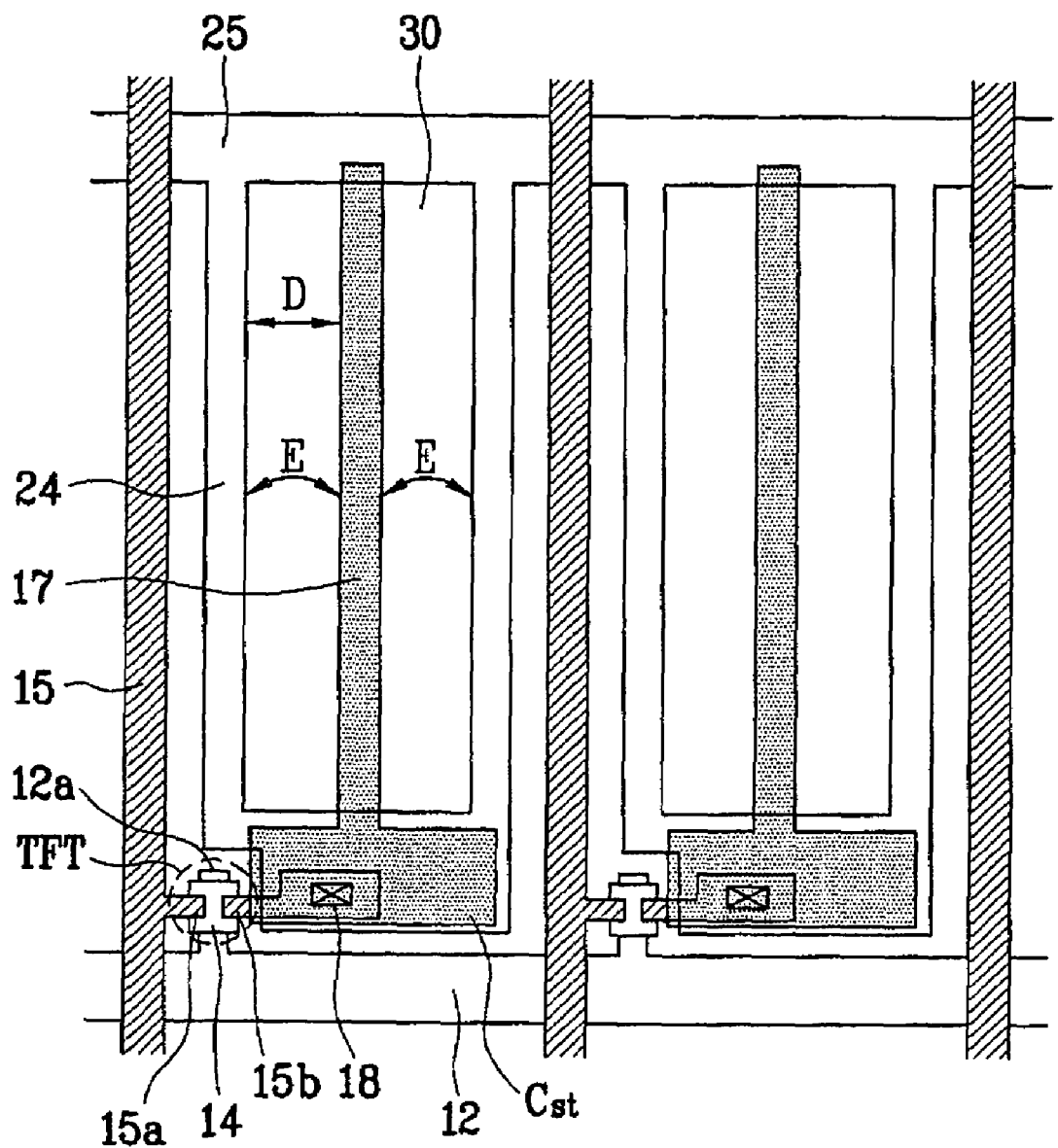
FIG. 1 is a plane view illustrating a related art IPS mode LCD device.
Figure 2:
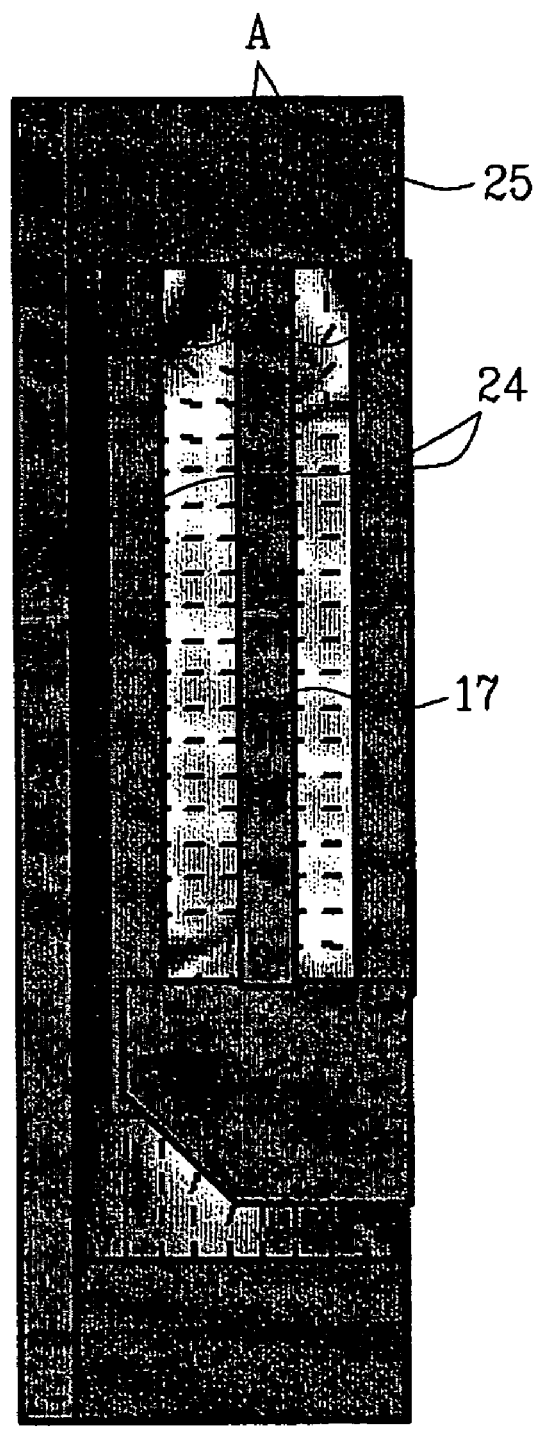
FIG. 2 is a diagram illustrating transmittance of light in FIG. 1.
Figure 3:
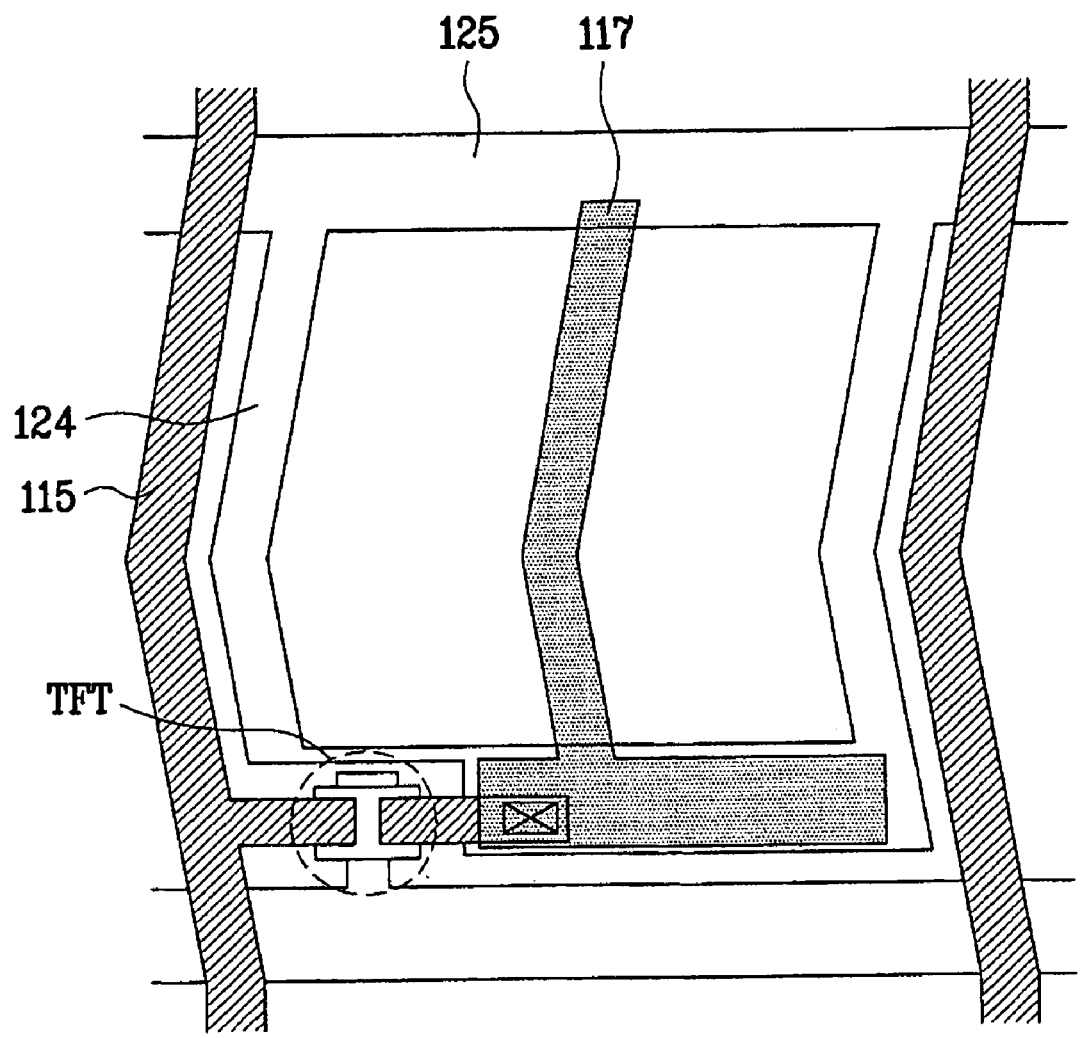
FIG. 3 is a plane view illustrating another related art IPS mode LCD device.
Figure 4:
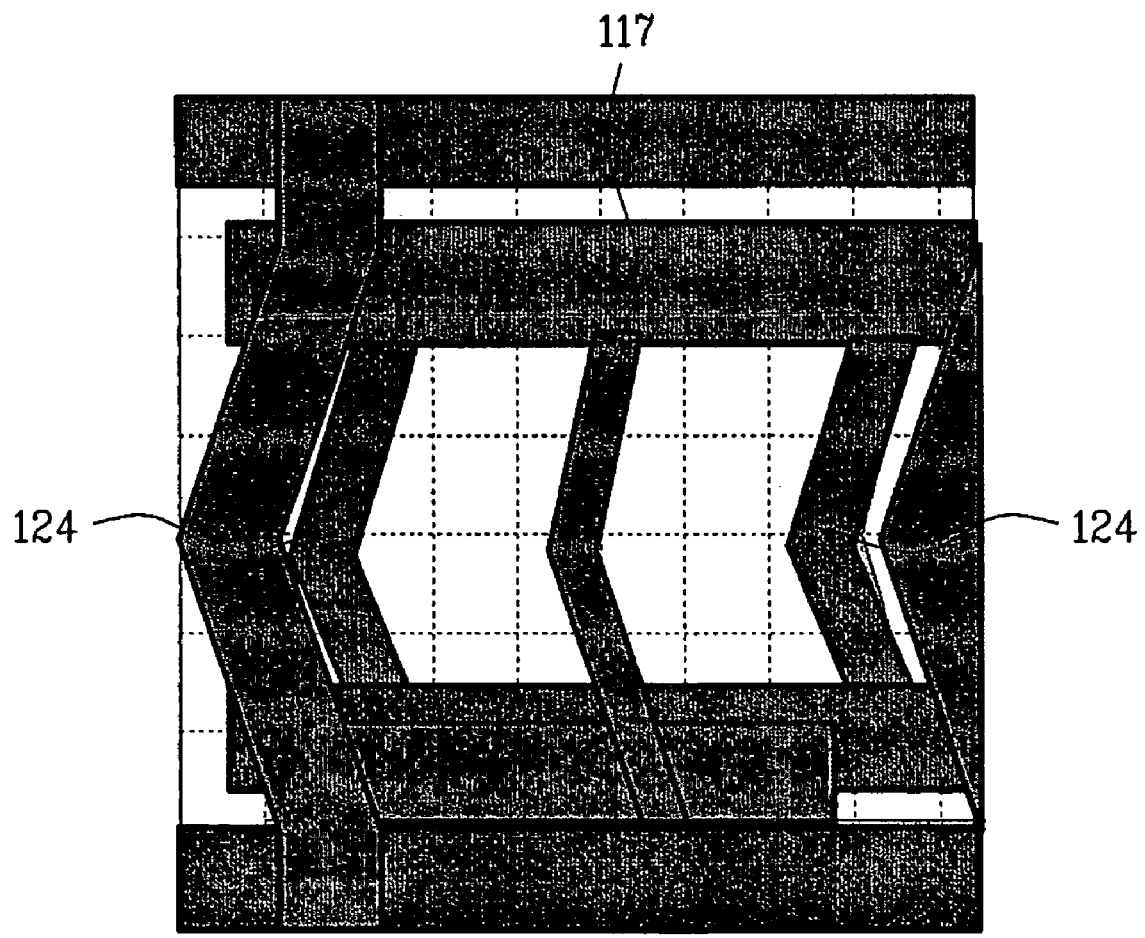
FIG. 4 is a diagram illustrating transmittance of light in FIG. 3.
Figure 5:
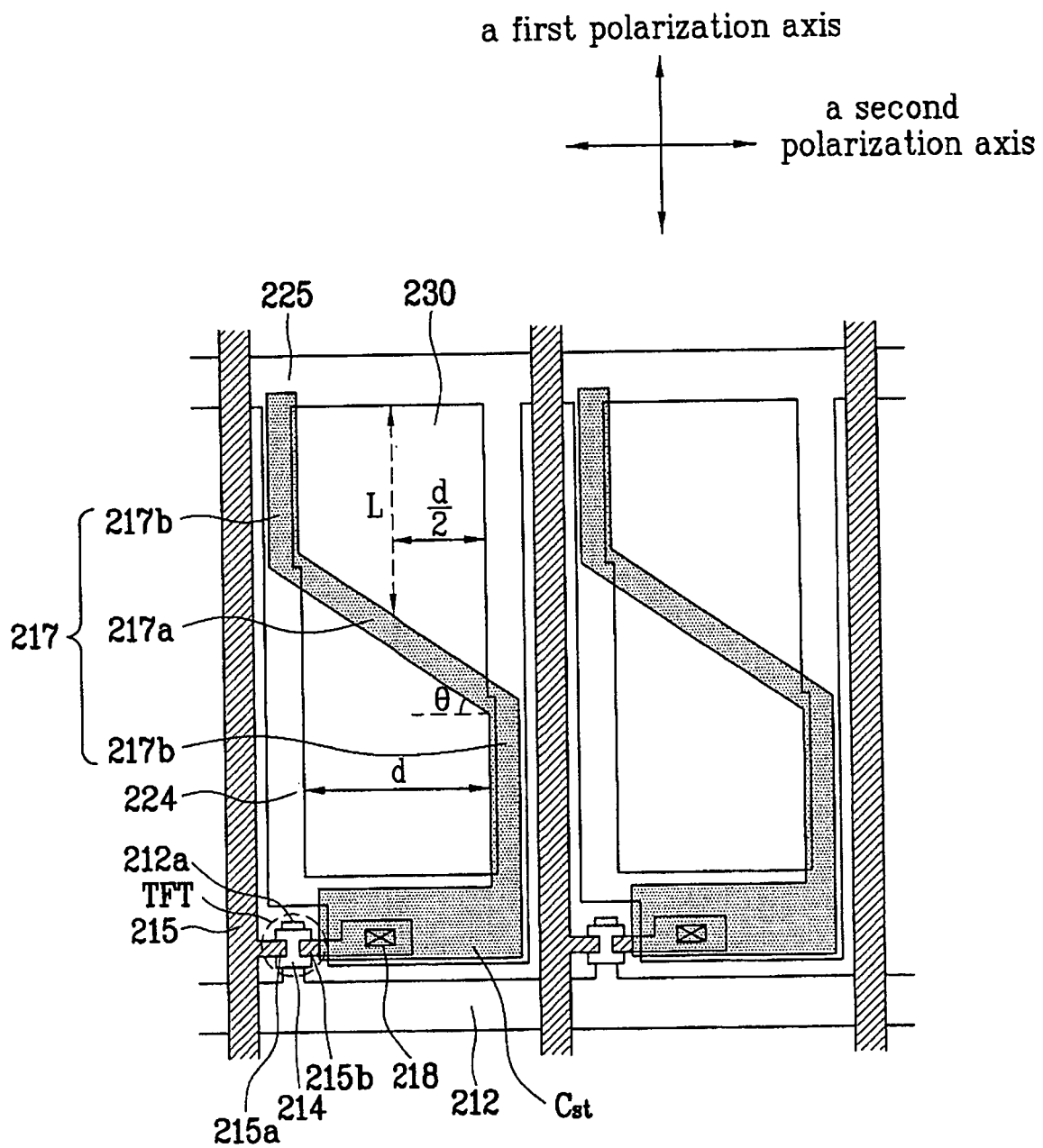
FIG. 5 is a plane view illustrating an IPS mode LCD device according to an exemplary embodiment of the present invention.
Figure 6:
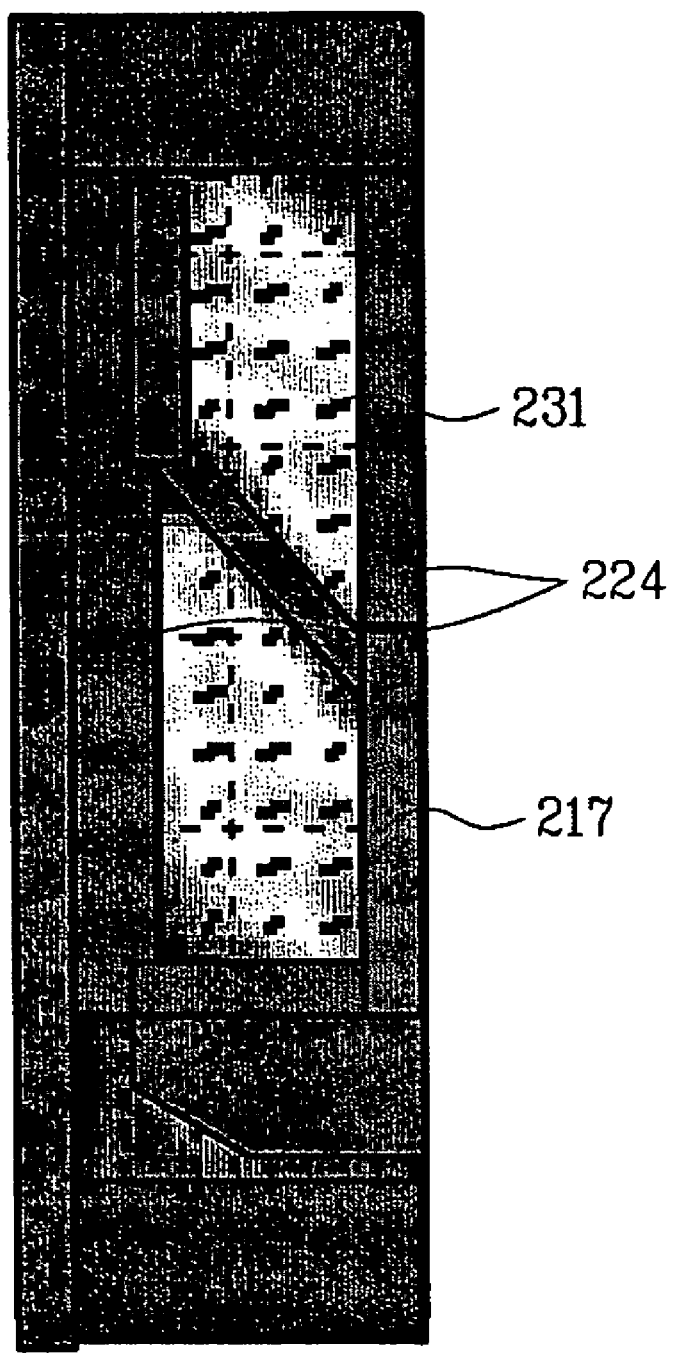
FIG. 6 is a diagram illustrating transmittance of light in FIG. 5.

FIG. 5 is a plane view illustrating an IPS mode LCD device according to an exemplary embodiment of the present invention, FIG. 6 is a diagram illustrating transmittance of light in FIG. 5, and FIG. 7A to FIG. 7C are plane views illustrating exemplary fabricating processes of the IPS mode LCD device according to the present invention. As shown in FIG. 5, a thin film transistor array substrate of the IPS mode LCD device includes a plurality of gate lines 212 arranged in a straight line, a plurality of data lines 215, thin film transistors (TFTs), common electrodes 224, and pixel electrodes 217 including both slant portions 217a and vertical portions 217b. The gate lines 212 vertically cross the data lines 215 to define pixel regions. Each of the thin film transistors is arranged at each intersection of the respective gate and data lines 212 and 215. The thin film transistors switch ON/OFF the applied voltages. Each common electrode 224 is formed extending from the common line 225 formed parallel with the gate line 212. The slant portion 217a of the pixel electrode 217 is formed to cross an opening region formed between the two common electrodes within the pixel region. The slant portion 217a crosses the opening region in a slant direction. The vertical portion 217b of the pixel electrode 217 is overlapped with the common electrode.

As described earlier, a single pixel region is divided into two sub-domains (i.e., two blocks 230) by the slant portion 217a of the pixel electrode. Each block 230 has the same size. In detail, each common electrode 224 is formed along the edge portion of the pixel region. And, common lines 225 are formed to connect each common electrode 224, which is formed in the adjacent pixel regions, with each other to transmit common signals to an active region. The common line 225 and the common electrode 224 are formed in a single body and on the same layer with each gate line 212. The slant portion 217a and the vertical portion 217b are formed in a single body. The vertical portion 217b is extended to connect with a drain electrode 215b through a contact hole 218, so that a pixel signal is applied thereto.

Each block 230 is defined by the vertical portion 217b of the pixel electrode, the slant portion 217a of the pixel electrode, and two common electrodes 224. Arrangement of the liquid crystal molecules is controlled by the transverse electric field generated between the adjacent pixel and common electrodes. The slant portion 217a of the pixel electrode 217 has a slant angle of θ (40°≦θ≦60°) about the gate line.

Referring to FIG. 5, the horizontal distance "d" (the distance between the vertical portion of the pixel electrode and its opposing common electrode) of the block 230 is determined to be in the range of 8 µm to 13 µm. The vertical distance "L" (the distance between the slant portion of the pixel electrode and the common line) measured at ½ of its horizontal distance is greater than the horizontal distance "d". Transmittance of light to the LCD panel is improved by the above design values of the block 230. Furthermore, as shown in FIG. 6, a disclination region (dark portion) is minimized.

To maximize area used for the opening region in the pixel region, the vertical portion 217b of the pixel electrode is overlapped with a portion of the common electrode 224. To prevent the overlapped common electrode from electrically affecting the transverse electric field generated between the vertical portion 217b of the pixel electrode and its adjacent common electrode 224, the width of the common electrode 224 at the overlapping portion is reduced. The width of the common electrode is reduced by 2 µm or greater at the overlapped portion. On the other hand, the portion of the common electrode not overlapped with the pixel electrode has its width maintained, so that the common electrode 224 has a dual line width. It is noted that the opening region is wider than that of the related art and the disclination region is reduced.

Meanwhile, portions of the common electrode 224 and the pixel electrode 217, which extend into the horizontal direction, are overlapped with each other to form a storage capacitor Cst. A gate insulating film and a passivation film are deposited between the common electrode 224 and the pixel electrode 217 to serve as insulating films for the storage capacitor. The gate insulating film also insulates the gate line 212 from the data line 215, and the passivation film insulates the data line 215 from the pixel electrode 217. Capacitance, in addition to the storage capacitor Cst, is formed between the vertical portion 217b of the pixel electrode and the portion of common electrode 224 overlapped with the vertical portion 217b. Therefore, an area of the storage capacitor Cst is minimized to obtain a wider opening region.

Although not shown, the thin film transistor array substrate is bonded to a color filter array substrate by interposing a liquid crystal layer therebetween. The color filter array substrate includes a black matrix layer that prevents light leakage, and R/G/B color filter layers formed to represent colors in each pixel region. First and second polarizing plates are attached to outer surfaces of the thin film transistor array substrate and the color filter array substrate. The first and second polarizing plates are arranged in such a manner that their polarizing axes vertically cross each other. Either the first polarizing axis or the second polarizing axis is parallel with the gate line. In addition, either the thin film transistor array substrate or the color filter array substrate is further provided with an alignment film at its inner side. A rubbing direction of the alignment film is parallel with any one of the first and second polarizing axis to obtain a normal black mode.

If the voltages are applied to the LCD device as constructed above, liquid crystal molecules 231 arranged initially in a vertical or horizontal direction are rearranged in a slant direction by the transverse electric field generated between the common electrode 224 and the pixel electrode 217. Rearrangement of the liquid crystal molecules in the upper block of the instant pixel region is different from that in the lower block to obtain two-domain effect. Therefore, it is possible to minimize the inverted domain region while improving the response speed of the liquid crystal molecules.

Figure 7A:
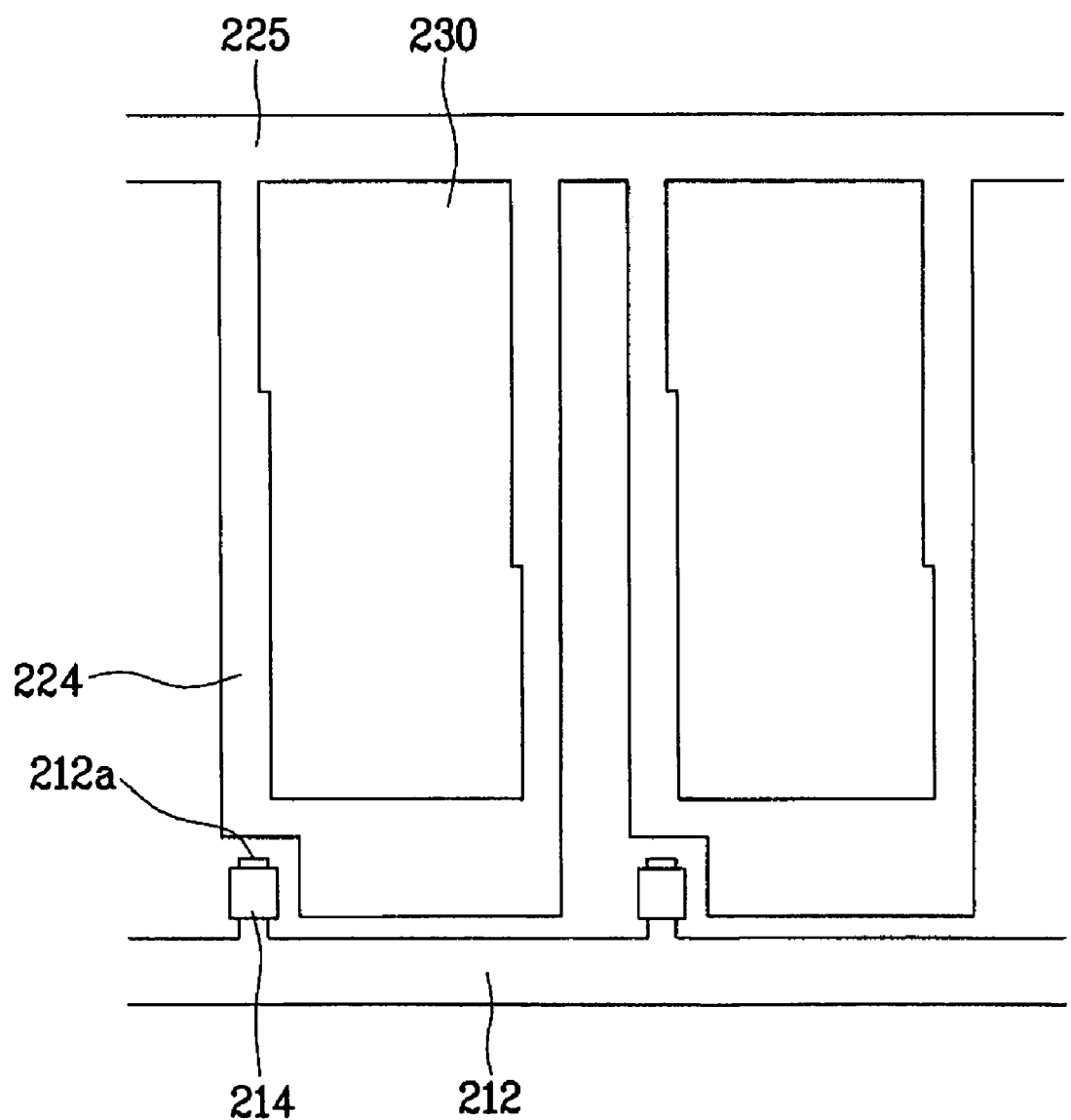
FIG. 7A to FIG. 7C are plane views illustrating exemplary fabricating processes of an IPS mode LCD device according to an exemplary embodiment of the present invention.

An exemplary method for manufacturing the thin film transistor array substrate according to the present invention will be described in more detail. As shown in FIG. 7A, metal having low specific resistance, such as Cu, Al, AiNd (Aluminum Neodymium), Mo, Cr, Ti, Ta, and MoW, is deposited on the substrate to prevent signals being delayed, then patterned to form the plurality of gate lines 212, the gate electrodes 212a, the common lines 225 and the common electrodes 224.

The common lines 225 are formed in parallel with the gate lines 212. The common electrodes 224 are formed extending from the common lines 225. In addition, the common electrodes 224 are formed to have a dual line width. The vertical portions 217b of the pixel electrodes will later overlap the portions of the common electrodes having a smaller line width.

Next, an inorganic insulating material such as SiOx or SiNx is deposited on the entire surface including the gate lines 212 by a plasma enhanced chemical vapor deposition (PECVD) process to form a gate insulating film (not shown). Amorphous silicon (a-Si:H) is deposited on the entire surface including the gate insulating film at a high temperature and then patterned to form an island shaped semiconductor layer 214 on the gate insulating film on the gate electrode.

Figure 7B:
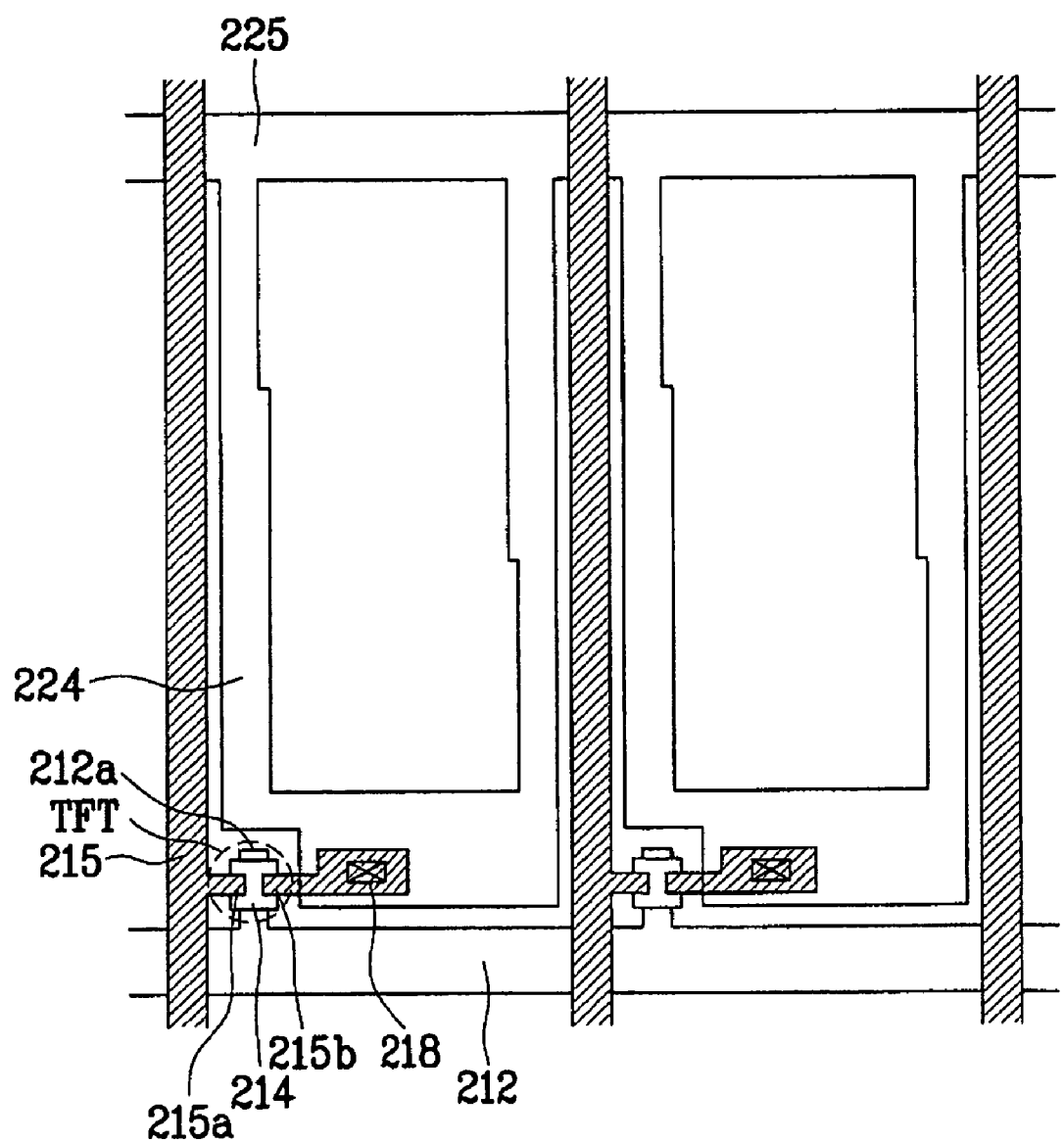

Subsequently, as shown in FIG. 7B, metal such as Cu, Al, AiNd, Mo, Cr, Ti, Ta, and MoW is deposited on the entire surface including the semiconductor layer 214, then patterned to form the plurality of data lines 215 and source/drain electrodes 215a and 215b. The data lines 215 are formed to cross the gate lines 212 vertically, thereby defining pixel regions. The source/drain electrodes 215a and 215b are respectively formed at both ends of the semiconductor layer 214, so that the thin film transistor having the gate electrode, the gate insulating film, the semiconductor layer 214 and source/drain electrodes 215a and 215b is completed. The thin film transistor controls on/off of the voltage applied to unit pixel.

Figure 7C:
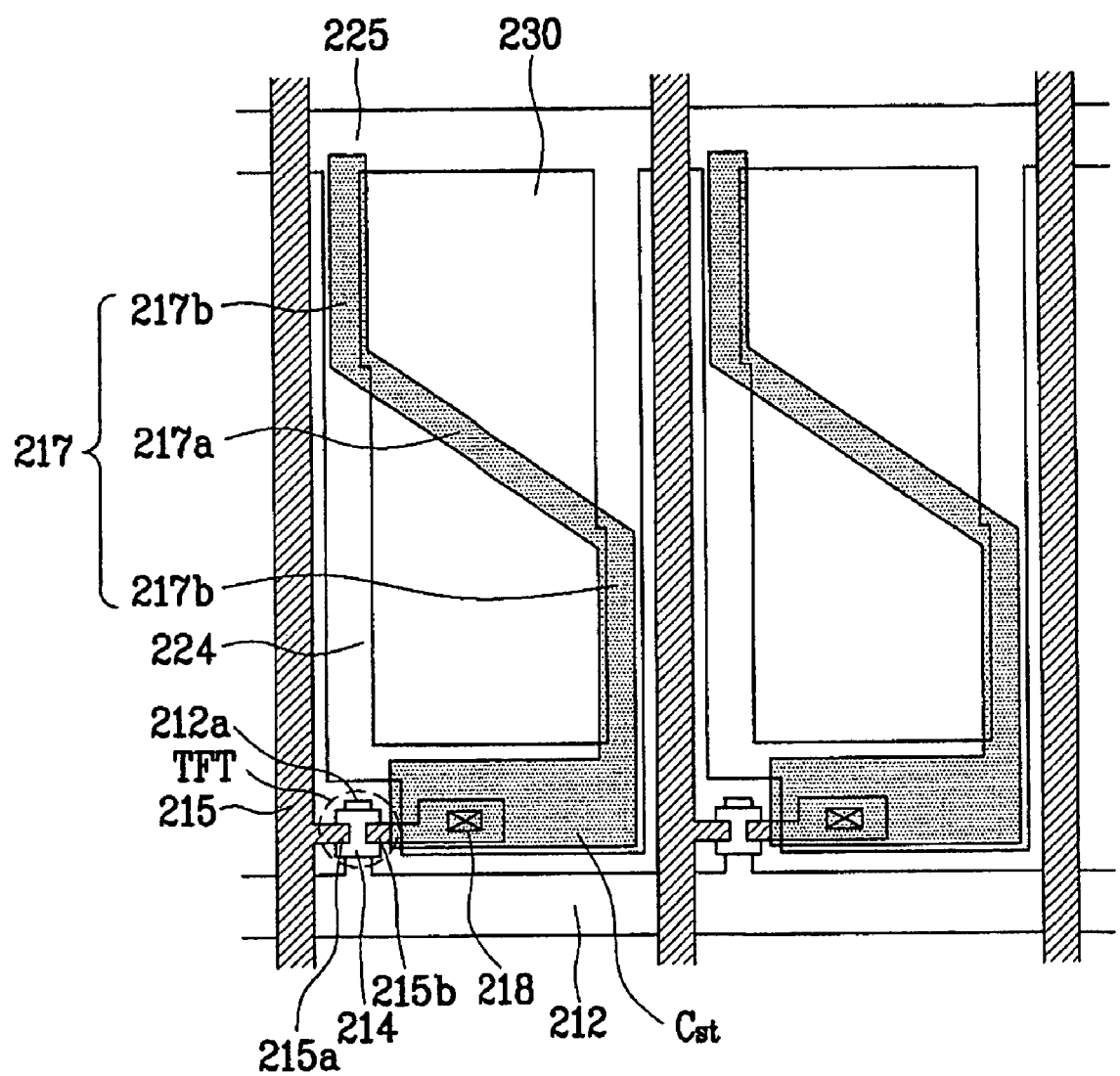

Next, an organic insulating material such as benzocyclobutene (BCB) and acryl resin or an inorganic insulating material such as SiOx or SiNx is deposited on the entire surface including the data lines 215 to form a passivation film (not shown). The passivation film is partially removed to form a contact hole 218 that exposes the drain electrode 215b. Afterwards, as shown in FIG. 7C, a transparent conductive material such as indium tin oxide (ITO) or indium zinc oxide (IZO) is deposited on the entire surface including the passivation film, then patterned to form each pixel electrode 217. The pixel electrode 217 is electrically connected to the drain electrode 215b through the contact hole 218.

The pixel electrode 217 includes a slant portion 217a and a vertical portion 217b formed in a single body. The slant portion 217a is arranged in a slant direction to cross the opening region, in which the opening region is formed between the two common electrodes 224. Then, the vertical portion 217b is overlapped with the common electrode 224. The slant portion 217a of the pixel electrode 217 is formed to have a slant angle of θ (40°≦θ≦60°) about the gate line. The vertical portion 217b of the pixel electrode is overlapped with the portion of the common electrode having a small line width, in which the small line width is in a range of 2 µm or greater. Thus, one pixel region is divided into two sub-domains so that the opening region is obtained having the maximum range and the disclination region is minimized.

The exemplary IPS mode LCD device of a high resolution model has been described above. However, the present invention is not limited to a pixel region having two sub-domains, but can be adapted to the larger pixel region where three or more electrodes can fit. In addition, the exemplary IPS mode LCD device according to the present invention has the following advantages.

First, since the pixel electrode is arranged to cross the opening region in a slant direction, in which the opening region is formed between the two common electrodes, it is possible to minimize the inverted domain region. Thus, the disclination region is reduced. Second, since the portion of the pixel electrode is formed in a slant direction and another portion of the pixel electrode is overlapped with the portion of the common electrode, it is possible to reduce the size of the pixel electrode, thereby obtaining a large opening region. More specifically, the improved opening ratio can easily be obtained by the optimized design rule, even if the size of the pixel region is varied.

Third, capacitance is additionally formed between the vertical portion of the pixel electrode and the portion of common electrode overlapped with the vertical portion. Therefore, an area of the storage capacitor is minimized to obtain a wider opening region. Lastly, the liquid crystal molecules are rearranged in different directions as the respective blocks have different electric field directions. In this case, the viewing angles of the respective blocks are compensated to obtain the multi-domain effect. Therefore, it is possible to minimize the inverted domain region and improve response speed of the liquid crystal molecules.

It will be apparent to those skilled in the art that various modifications and variations can be made in the in-plane switching mode LCD device of the present invention without departing from the spirit or scope of the invention. Thus, it is intended that the present invention covers the modifications and variations of this invention provided they come within the scope of the appended claims and their equivalents.

What is claimed is:

1. An IPS mode LCD device, comprising:
   gate and data lines formed on a first substrate, the gate lines cross the data lines vertically to define pixel regions;
   thin film transistors formed at each intersection of the gate lines and the data lines;
   common lines formed in parallel with the gate lines;
   common electrodes formed extending from the common lines, the common electrodes formed in parallel with the data lines;
   pixel electrodes having a slant portion and a vertical portion formed in a single body, the slant portion arranged to cross each pixel region in a slant direction, and the vertical portion of the pixel electrode overlaps with the common electrodes; and
   a second substrate bonded to the first substrate and interposing a liquid crystal layer therebetween.

2. The IPS mode LCD device as claimed in claim 1, wherein the thin film transistors include a gate electrode, a semiconductor layer, and source/drain electrodes.

3. The IPS mode LCD device as claimed in claim 2, wherein the vertical portion of each pixel electrode is extended to connect with a drain electrode of each thin film transistor.

4. The IPS mode LCD device as claimed in claim 1, wherein the portion of each common electrode having a small width overlaps with the vertical portion of the each pixel electrode.

5. The IPS mode LCD device as claimed in claim 4, wherein the common electrodes have a dual line width.

6. The IPS mode LCD device as claimed in claim 4, wherein the small width includes at least 2 μm less width than the other portion of the common electrode.

7. The IPS mode LCD device as claimed in claim 1, wherein the slant portion of the pixel electrode has a slant angle of 40° to 60° about the gate line.

8. The IPS mode LCD device as claimed in claim 1, wherein the horizontal distance between the vertical portion of the pixel electrode and its opposing common electrode is in the range of 8 μm to 13 μm.

9. The IPS mode LCD device as claimed in claim 8, wherein the vertical distance measured at ½ of the horizontal distance between the slant portion of the pixel electrode and the common line is greater than the horizontal distance.

10. The IPS mode LCD device as claimed in claim 1, further comprising a storage capacitor formed at the overlapped portion between the common electrode and the pixel electrode.

11. The IPS mode LCD device as claimed in claim 1, wherein the gate lines, the common lines and the common electrodes are formed on the same layer.

12. The IPS mode LCD device as claimed in claim 1, wherein the first and second substrates are provided with alignment films.

13. The IPS mode LCD device as claimed in claim 1, wherein the first and second substrates are provided with first and second polarizing plates.

14. The IPS mode LCD device as claimed in claim 13, wherein any one polarizing axis of the first and second polarizing plates is positioned in vertical to the other polarizing axis.

15. The IPS mode LCD device as claimed in claim 13, wherein any one polarizing axis of the first and second polarizing plates is arranged in parallel with the gate lines.

16. The IPS mode LCD device as claimed in claim 1, further comprising a gate insulating layer between the gate lines and the data lines.

17. The IPS mode LCD device as claimed in claim 1, further comprising a passivation layer between the data lines and the pixel electrodes.

* * * * *